March 10, 1931. R. C. BENNER ET AL 1,795,705
PROCESS OF PRODUCING ELEMENTAL SULPHUR
Filed Sept. 8, 1926
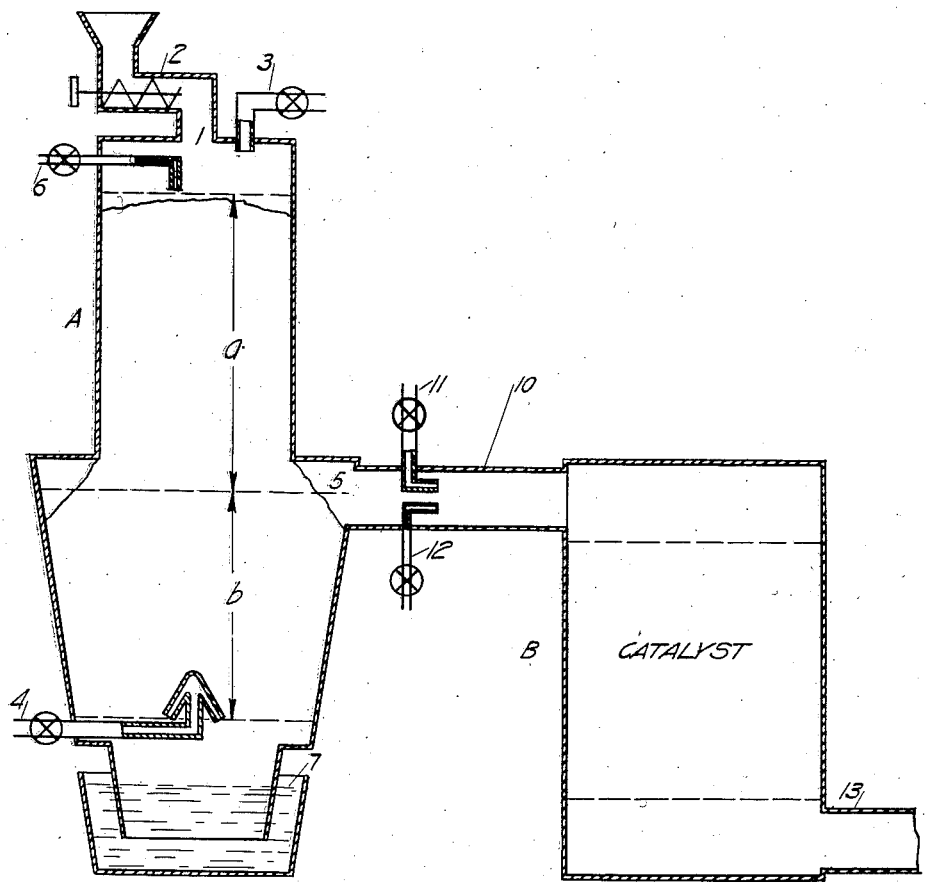
INVENTORS
RAYMOND C. BENNER
ALFRED P. THOMPSON
BY Forbes Silsby
ATTORNEY Patented Mar. 10, 1931

1,795,705

UNITED STATES PATENT OFFICE

RAYMOND C. BENNER, OF BAYSIDE, AND ALFRED PAUL THOMPSON, OF JACKSON HEIGHTS, NEW YORK, ASSIGNORS TO GENERAL CHEMICAL COMPANY, OF NEW YORK, N. Y., A CORPORATION OF NEW YORK

PROCESS OF PRODUCING ELEMENTAL SULPHUR

Application filed September 8, 1926. Serial No. 134,161.

This invention relates in general to improvements in the production of sulphur in the elemental form, and more particularly to the production of elemental sulphur from sulfide ores or from sulphur dioxide and sulfide ores.

In our co-pending U. S. application Serial No. 134,160, filed September 8, 1926, we have disclosed and claimed a method for the production of elemental sulphur from sulfide ores or from sulphur dioxide and sulfide ores, by contacting in continuous counter-current flow a mixture of sulfide ore and a carbonaceous reducing agent with an oxidizing gas, which may comprise sulphur dioxide. In the present application which comprises a modification of the invention disclosed in this above specified application, we have disclosed a process whereby the mixture of sulfide ore and carbonaceous fuel is first contacted with a gas, which may comprise considerable amounts of sulphur dioxide, in co-current flow, and finally subjected to an oxidizing atmosphere comprising gases containing free oxygen in counter-current flow.

Our invention contemplates the production of elemental sulphur by the reduction of sulphur dioxide by means of a mixture of a sulfide ore or ores such as pyrites or pyrrhotite and a carbonaceous reducing agent, wherein the sulphur from the ore as well as that introduced in the form of sulphur dioxide is recovered in the elemental form. Our invention further contemplates the production of elemental sulphur directly from sulfide ores by mixing therewith a regulated amount of carbonaceous reducing agent preferably comprising substantial amounts of hydrocarbons, and contacting such mixture with an oxidizing gas exclusive of sulphur dioxide but comprising free oxygen, as for example air.

The principal objects of our present invention are, first, to provide an efficient and economical process for the production of elemental sulphur directly from sulfide ores, whereby substantially complete recovery of all sulphur from the ore is obtained; secondly, to provide a more economical process for the reduction of sulphur dioxide containing gases such as gases from smelters or roasting furnaces, wherein a considerable portion of a cheaper and more available fuel than coal, namely sulfide ores, may be employed as a heating and reducing agent; thirdly, to provide a process whereby the products of the reduction process comprising large amounts of sulphur vapor are obtained substantially free from contaminating impurities such as soot and the tarry constituents of carbonaceous reducing agents.

The accompanying drawing represents diagrammatically one general arrangement of apparatus for carrying out our process. The reduction chamber A is provided at the top with an inlet 1 through which a mixture of bituminous coal, or other carbonaceous reducing agent, preferably comprising substantial amounts of hydrocarbons, and a sulfide ore or ores, as for example pyrites, in the granular or finely divided state, are continuously introduced into the chamber by a suitable feed mechanism 2. While the particular physical nature of the coal and sulfide ore is not of especial importance, nevertheless it should be of such form as will facilitate uniform mixing and distribution and provide for rapid coking of the coal. Also, at the top of the chamber A is an inlet 3 through which sulphur dioxide, a limited amount of air, or mixture of sulphur dioxide and air, are admitted.

Near the bottom of the chamber A is an inlet 4 through which air, or a mixture of sulphur dioxide and air may be admitted. Intermediate the top and bottom of the chamber and preferably near the center, or just below, there is provided an offtake 5 through which the gaseous products of the reduction process are removed.

The solid fuel entering the top of the chamber falls downwardly through the zone $a$ in co-current flow with the gases introduced through the inlet 3. Upon reaching the zone $b$ the solid fuel is subjected to a counter-current flow of gas introduced through the inlet 4.

The reactions which take place in the various parts of the reduction chamber A may be most conveniently described with reference to the zones $a$ and $b$. By way of example we will describe the operation of our process when employing pyrites as the sulfide ore and bituminous coal as the carbonaceous reducing agent.

In the zone $a$ the gases and solids are in co-current flow. In the upper portion thereof, the atmosphere is oxidizing (though not strongly so) due to the presence of free oxygen and sulphur dioxide in the gas admitted through the inlet 3. The amount of free oxygen is limited, however, to that necessary to maintain the required heat in the upper zone and is quickly taken up by the carbonaceous fuel forming carbon dioxide and the atmosphere in the center and lower portion of the zone $a$ becomes strongly reducing.

The required heat may be supplied externally of the reduction chamber in which event little or no free oxygen or air will be added at the inlet 3 and substantially the entire zone $a$ will be of a reducing quality. In this zone $a$ the volatile matter of the carbonaceous reducing material is liberated with the production of coke. Also the sulphide ore under the influence of heat decomposes to yield free sulphur according to the equation:

$$FeS_2 + heat \rightarrow FeS + S$$

A part of the sulphur freed may react with the volatile matter of the coal to yield hydrogen sulfide. Also, when our process is employed for the reduction of sulphur dioxide, the sulphur dioxide being introduced through the inlet 3 reacts with the hydrocarbons and with the coke to yield hydrogen sulfide, sulphur vapor, steam, etc. The carbon dioxide produced in the upper part of zone $a$ is reduced by the coke to carbon monoxide. The iron sulfide resulting from the partial desulphurization of the pyrites serves to reduce a portion of the sulphur dioxide according to the equation:

$$3FeS + 2SO_2 \rightarrow Fe_3O_4 + 5S$$

The heat required for maintaining the reduction process is supplied by the heat of oxidation of the carbonaceous reducing material by the sulphur dioxide and/or a limited amount of air introduced through the inlet 3, or it may be supplied externally of the reduction chamber. We have found that the temperature of the reduction chamber should be about 700–800° C. for efficient operation.

The solid material falling from zone $a$ to zone $b$ comprises chiefly unoxidized FeS, iron oxide, and coke. In the lower portion of this zone $b$ the atmosphere is quite strongly oxidizing due to the admission of considerable air, as well as sulphur dioxide, if desired, through the inlet 4. The oxidizing intensity, however, diminishes in the upper portion of the zone, that is, near the offtake 5, and the atmosphere becomes slightly reducing. The unoxidized iron sulfide is completely burned by the air admitted through the inlet 4, yielding sulphur dioxide and $Fe_2O_3$ or $Fe_3O_4$. The amount of air admitted is however limited so that any excess of oxygen over that required to oxidize the FeS and any carbon present is avoided. This sulphur dioxide together with that which may be introduced with the air through the inlet 4 is at least partially reduced by the coke in the upper portion of the zone $b$ to yield free sulphur.

The heat developed by the oxidation of the iron sulfide to $Fe_2O_3$ or $Fe_3O_4$, serves to provide a large portion of the heat required to maintain the temperature of the reduction chamber thereby reducing the use of the more expensive and less available coal and oil for heating purposes.

In order to provide for an easily regulated reducing atmosphere in the zone $a$ we have found it advantageous to provide an inlet 6 at or near the top of the chamber through which petroleum oil or other liquid or gaseous hydrocarbon may be introduced. It will be obvious to one skilled in the art that the strength of the reducing atmosphere might be varied by a variation in the proportion of coal, but the latter is not subject to delicate control, while the introduction of liquid hydrocarbon not only permits fine regulation but is also advantageous in lowering the temperature required for the reduction process.

As more particularly pointed out in our copending applications Serial No. 91,675, filed March 2, 1926, and Serial No. 134,160, filed September 8, 1926, we prefer to employ a carbonaceous reducing agent comprising considerable amounts of volatile hydrocarbon, since the presence of such hydrocarbon permits lower temperatures for the reduction of the sulphur dioxide and also prevents the formation of objectionable carbon oxysulfide.

According to our novel process a substantially constant depth of bed of the solid charge is maintained extending well up toward the top of the chamber A. As the charge gradually falls the bed is continually renewed by the introduction of fresh sulfide ore and fuel. By passing the gaseous products resulting from the carbonizing of the coal in the top of zone $a$ downwardly through the charge, the soot and tarry impurities by which the sulphur is contaminated are removed by a mechanical filtering action of the coke, or are burned in the fuel bed, and the gases reach the offtake 5 in a substantially clean state. This method of operation avoids the necessity of a dust chamber to separate the ash and soot which, if not removed, may have a deleterious effect on the subsequent catalyst chamber.

The gaseous products of the upper zone $a$ comprise chiefly sulphur vapor, hydrogen sulfide, hydrocarbons, carbon monoxide and nitrogen, while those of the lower zone $b$ comprise chiefly sulphur vapor, sulphur dioxide, carbon monoxide and carbon dioxide, and nitrogen. The upward and downward gas streams are mingled and removed at the offtake 5. By a proper regulation of the air, sulphur dioxide, coal and sulfide ore admitted to the chamber, it is possible to provide for complete oxidation of the coal and ore, maintain the required temperature for the reduction process, and reduce substantially all the sulphur to the elemental form or into the form of gases comprising reducing sulphur compounds such as hydrogen sulfide which will react with any unreduced sulphur dioxide present. In certain cases we prefer to operate our novel process so that there will be a considerable excess of hydrogen sulfide and carbon monoxide over that proportion which would react with the sulphur dioxide present. In such event sulphur dioxide is added to these gaseous products as hereinafter described.

The ash and cinder produced in the process may be eliminated in any of several ways as will be apparent to one skilled in the art. When employing only moderate quantities of sulfide ore, and a comparatively large proportion of coal, the temperature of the reduction process will ordinarily be maintained below that at which the ash and cinder will fuse, and therefore such ash and cinder may be discharged as an unsintered product by such well-known means as a water seal as shown at 7. When employing larger proportions of sulfide ore, the temperature of the reduction process will ordinarily be maintained somewhat higher, and the ash and cinder will tend to fuse or sinter. Such fused or sintered mass will reach the discharge means in a substantially solid state and may be discharged by the well-known methods applicable thereto, such as, for example, the ram discharge method employed in the high temperature gas producers. When, however, a very large proportion of sulfide ore is employed it will be found most satisfactory to discharge the ash and cinder in the form of a slag. This may be accomplished by the addition of suitable proportions of lime and silica to the charge and increasing the temperature of the lower zone of the chamber whereby an easily fusible calcium iron silicate is produced in the bottom of the reduction chamber and may be tapped off.

In case the ore contains valuable metal constituents, as for example copper, the desulphurizing process will preferably not be carried to completion but will be operated to produce a matte rich in the valuable metal sulfide, and the slag and matte will be separately removed as in the well-known pyritic smelting operations.

To provide for the complete interaction of the reducing gases and any unreduced sulphur dioxide which may be present in the products at the offtake, the gas mixture is conducted by a conduit 10 to a chamber B. In the chamber B there is provided a suitable catalyst to aid in the interaction. To regulate the composition of the gases entering the catalyst chamber B, we have provided in the conduit 10, inlets 11 and 12, through which an oxidizing gas such as sulphur dioxide or air, and a reducing agent such as oil or carbon monoxide, respectively, may be admitted. If the gas mixture from the reduction chamber comprises an excess of oxidizing gases such as sulphur dioxide, a reducing agent such as carbon monoxide or oil spray will be added. If the mixture comprises an excess of reducing gases such as hydrogen sulfide, carbon monoxide, methane, etc., an oxidizing agent such as sulphur dioxide or air will be added. By a proper control of the amount of oxidizing or reducing agents, depending on the composition of the products of the reduction chamber, which are admitted, the composition of the gaseous mixture entering the catalyst chamber may be adjusted so that there will be present in the mixture interacting proportions of reducing and reducible gases. The reduction of the sulphur dioxide by the reducing gases will occur according to the following typical equations:

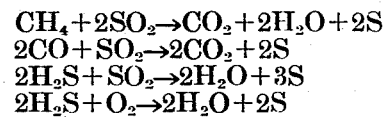

$$CH_4 + 2SO_2 \rightarrow CO_2 + 2H_2O + 2S$$
$$2CO + SO_2 \rightarrow 2CO_2 + 2S$$
$$2H_2S + SO_2 \rightarrow 2H_2O + 3S$$
$$2H_2S + O_2 \rightarrow 2H_2O + 2S$$

The sulphur vapor thus produced in the catalyst chamber supplements that portion produced in the reduction chamber so that there is approximately complete recovery of all the sulphur introduced into the system in the elemental form.

The temperature of the catalyst chamber should be maintained at about 350° C. or above to prevent the condensation of the sulphur vapor and provide for rapid interaction of the gases. This temperature will be readily obtained by the sensible heat in the gaseous products from the reduction chamber and by the heat of interaction of reducing and reducible gases.

The sulphur vapor and inert gases are removed from the catalyst chamber through the outlet 13 and the sulphur vapor may be condensed by any suitable heat interchange apparatus, as for example a waste heat boiler, and collected. The gases leaving the condenser may be treated to remove any residual sulphur mist or vapor by scrubbing with a baffle scrubber, absorption in oil, etc., or the sulphur mist may be electrically precipitated.

Any of the known catalysts for aiding the reduction of sulphur dioxide, such as iron oxide, calcium sulfate, calcium sulfide, etc., may be employed in the catalyst chamber. We have found, however, that particularly good results are obtained when using bauxite, a natural occurring mixture comprising the oxides of alumina and iron and various impurities. Of the various types of bauxite, that variety commonly known as French bauxite has been found to be particularly useful because of its resistance to disintegration at the temperature employed.

We have specified pyrites or pyrrhotite as suitable sulfide ores in the operation of our novel process. This is, however, only by way of example, since other sulfide ores and concentrates of similar type may be used with similar advantages.

Likewise we have referred to the use of bituminous coal as the preferred type of reducing means. But it will be obvious that other coals and carbonaceous material may be used although when employing carbonaceous materials containing small amounts of volatile hydrocarbon we find it preferable to add oil or other liquid hydrocarbon to overcome this deficiency.

According to the preferred method of carrying out our novel process, the charge will contain 10% or more of carbonaceous fuel, and in case our process is employed in the reduction of sulphur dioxide the proportion of carbonaceous fuel may be as high as 50% or more. When employing these proportions of ore and carbonaceous fuel, we practically dispense with the use of steam. Steam, however, may be employed in the operation of our process to regulate the temperature and to aid in the desulphurization of the ore according to the well-known methods.

The term "oxidizing gas" as used throughout the specification and claims is intended to include sulphur dioxide gas as well as oxygen or air since this gas exhibits an oxidizing effect on carbon or sulfide ore at the temperature employed. We also include within the term, gases which comprise more oxygen than air, as for example commercial oxygen or oxygen enriched air. The operation may be carried out at normal pressure or at increased pressures, in which latter case the entire system is maintained under positive pressure, i. e. of the order of several atmospheres.

Various modifications may be made in our novel process without departing from the spirit thereof and we do not wish to limit the scope except as defined in the appended claims.

We claim:

1. The process of producing elemental sulphur which comprises the step of contacting a mixture of sulfide ore and a carbonaceous reducing agent in co-current flow with an oxidizing gas, said carbonaceous reducing agent being in amount sufficient to result in the production of sulphur substantially in the elemental form.

2. The process of producing elemental sulphur which comprises maintaining a bed of a charge comprising sulfide ore and carbonaceous fuel and passing a limited amount of an oxidizing gas therethrough in co-current flow.

3. The process of producing elemental sulphur which comprises the step of contacting a mixture of sulfide ore and a carbonaceous reducing agent in co-current flow with a gas comprising substantial amounts of sulphur dioxide.

4. The process of producing elemental sulphur which comprises introducing a mixture of sulfide ore and a carbonaceous fuel into a heated reducing atmosphere, introducing a limited amount of an oxidizing gas with the solid charge, causing the gases to flow co-currently with the solids through the reducing atmosphere, and finally contacting the solid charge in an oxidizing atmosphere with an oxidizing gas comprising free oxygen in counter-current flow.

5. The process of producing elemental sulphur which comprises maintaining a bed of a charge comprising sulfide ore and a carbonaceous fuel in a heated reducing atmosphere, introducing a limited amount of an oxidizing gas and passing said gas and the gaseous products of the reaction in co-current flow with the solids through said bed, and finally contacting the solids in an oxidizing atmosphere with an oxidizing gas in counter-current flow.

6. The process of producing elemental sulphur which comprises contacting a mixture of sufide ore and a carbonaceous reducing agent with a gas comprising substantial amounts of sulphur dioxide in co-current flow, and then with a gas comprising free oxygen in counter-current flow.

7. The process of producing elemental sulphur which comprises contacting a mixture of sulfide ore and a carbonaceous reducing agent comprising substantial amounts of hydrocarbons in a reducing atmosphere with a gas comprising substantial amounts of sulphur dioxide in co-current flow and then in an oxidizing atmosphere with a gas comprising free oxygen in counter-current flow.

8. The process of producing elemental sulphur which comprises maintaining a bed of a charge comprising sulfide ore and a carbonaceous fuel containing substantial amounts of hydrocarbons, in a heated reducing atmosphere, introducing a limited amount of an oxidizing gas comprising sulphur dioxide, passing said gas and the gaseous reaction products in co-current flow with the solids through the reducing atmosphere, and finally contacting the solid charge in an oxidizing atmosphere with an oxidizing gas comprising free oxygen in counter-current flow.

9. The process of producing elemental sulphur which comprises passing a mixture of sulfide ore and a carbonaceous reducing agent downwardly through a reducing zone in co-current flow with the gaseous products thereof, subsequently passing said mixture through an oxidizing zone in counter-current flow to the gaseous products thereof, and removing the gaseous products of the upward and downward gas streams at a point intermediate thereof.

10. The process of producing elemental sulphur which comprises passing a mixture of pyrites and bituminous coal through a reducing zone in co-current flow with a gas comprising substantial amounts of sulphur dioxide, subsequently passing the mixture through an oxidizing zone in counter-current flow with a gas comprising free oxygen and sulphur dioxide and removing the gaseous products of the upward and downward gas streams at a point intermediate thereof.

11. The process of producing elemental sulphur which comprises passing a mixture of sulfide ore and a carbonaceous reducing agent comprising substantial amounts of hydrocarbons through a reducing atmosphere in co-current flow with a gas comprising substantial amounts of sulphur dioxide, subsequently passing the mixture through an oxidizing atmosphere in counter-current flow with a gas comprising free oxygen, regulating the proportions of sulfide ore, carbonaceous material, sulphur dioxide, and free oxygen, to provide for substantially complete reduction of all the sulphur in the system to the elemental form and hydrogen sulfide, and removing the gaseous products of the two gas streams at a point intermediate thereof.

12. The process of producing elemental sulphur which comprises introducing a mixture of sulfide ore and a carbonaceous reducing agent into a heated reaction chamber, introducing a gaseous oxidizing agent therewith in an amount sufficient to maintain the required temperature by the oxidation of a portion of the carbonaceous material in the top portion of said chamber, maintaining a reducing atmosphere in a central portion of said chamber by an excess of carbonaceous fuel, passing the gaseous and solid products in co-current flow through the reducing atmosphere, contacting the solid charge in an oxidizing atmosphere with an oxidizing gas comprising free oxygen in counter-current flow, and removing the gaseous products of both co-current and counter-current streams at a point intermediate thereof.

13. The process of producing elemental sulphur which comprises introducing a mixture of sulfide ore and a carbonaceous reducing agent into a heated reaction chamber, introducing a gaseous oxidizing agent comprising sulphur dioxide therewith in an amount sufficient to maintain the required temperature by the oxidation of a portion of the carbonaceous material in the top portion of said chamber, maintaining a reducing atmosphere in a central portion of said chamber by an excess of the carbonaceous fuel, passing the gaseous and solid products in co-current flow through the reducing atmosphere, contacting the solid charge in an oxidizing atmosphere with an oxidizing gas comprising free oxygen in counter-current flow, and removing the gaseous products of both co-current and counter-current streams at a point intermediate thereof.

14. The process of producing elemental sulphur which comprises passing a mixture of sulfide ore and a carbonaceous reducing agent comprising substantial amounts of hydrocarbons through a reducing zone in co-current flow with a gas comprising substantial amounts of sulphur dioxide and then through an oxidizing zone in counter-current flow with a gas comprising free oxygen, regulating the proportions of sulfide ore, carbonaceous material, sulphur dioxide, and free oxygen, to provide for substantially complete reduction of all the sulphur in the system to the elemental form and hydrogen sulfide, removing the gaseous products of the co-current and counter-current gas streams at a point intermediate thereof, regulating the composition of such gaseous products by the addition of an oxidizing agent to provide substantially interacting proportions of reducing and reducible gases and passing such mixture in contact with a suitable catalyst to complete the interaction to yield elemental sulphur.

15. The process of producing elemental sulphur which comprises passing a mixture of sulfide ore and a carbonaceous reducing agent comprising substantial amounts of hydrocarbons through a reducing zone in co-current flow with the gaseous products thereof, and then through an oxidizing zone in counter-current flow with the gaseous products thereof, regulating the amount of sulfide ore to provide a major portion of the heat required to maintain the required temperature for the reduction process by the oxidation thereof, and regulating the amount of carbonaceous reducing agent to reduce substantially all of the sulphur in the system to the elemental form.

16. The process of producing elemental sulphur which comprises passing a mixture of sulfide ore and a carbonaceous reducing agent comprising substantial amounts of hydrocarbons through a reducing zone in co-current flow with the gaseous products thereof, and then through an oxidizing zone in counter-current flow with the gaseous products thereof, regulating the amount of sulfide ore to provide a major portion of the heat required for the reduction process by the oxidation of said ore, regulating the amount of carbonaceous reducing agent to reduce substantially all of the sulphur to the elemental form, removing the gaseous products of the co-current and counter-current gas streams at a point intermediate thereof, adjusting the composition of the gaseous products by the addition of an oxidizing or reducing agent to provide interacting proportions of reducing and reducible gases and passing such gas mixture in contact with a suitable catalyst to complete the interaction to yield elemental sulphur.

17. The process of producing elemental sulphur which comprises passing a mixture of sulfide ore and a carbonaceous reducing agent comprising substantial amounts of hydrocarbons downwardly through a reducing atmosphere in co-current flow with a gas comprising substantial amounts of sulphur dioxide, subsequently passing the mixture through an oxidizing atmosphere in counter-current flow with a gas comprising free oxygen, and discharging the ash and cinder in a substantially solid state.

18. The process of producing elemental sulphur which comprises passing a mixture of pyrites and bituminous coal downwardly through a reducing zone in co-current flow with a gas comprising substantial amounts of sulphur dioxide, subsequently passing the mixture through an oxidizing zone in counter-current flow with a gas comprising free oxygen and sulphur dioxide, removing the gaseous products of the upward and downward gas streams at a point intermediate thereof and discharging the ash and cinder in a substantially solid state.

19. The process of producing elemental sulphur which comprises introducing a charge comprising sulfide ore and carbonaceous fuel into a reduction chamber, maintaining a bed of the moving solid products of the reaction of said charge, causing the gaseous products of said reaction to flow co-currently with the solids forming said bed, and finally contacting the solids with an oxidizing gas in counter-current flow.

20. The process of producing elemental sulphur which comprises introducing a charge comprising sulfide ore and carbonaceous fuel into a reducing atmosphere, causing the solid products of the charge to travel co-currently with the gaseous products through said reducing atmosphere, then passing the solid products through an oxidizing atmosphere, and withdrawing the gaseous products of the reducing and oxidizing atmospheres at a point intermediate thereof.

In testimony whereof, we affix our signatures.

RAYMOND C. BENNER.
ALFRED PAUL THOMPSON.